(12) United States Patent
Menon et al.

(10) Patent No.: US 8,296,336 B2
(45) Date of Patent: Oct. 23, 2012

(54) TECHNIQUES FOR EFFICIENT DATALOADS INTO PARTITIONED TABLES USING SWAP TABLES

(75) Inventors: Prakash Menon, Sunnyvale, CA (US); Swati Iyengar, Sunnyvale, CA (US)

(73) Assignee: Oracle International Corp., Redwood Shores, CA (US)

( * ) Notice: Subject to any disclaimer, the term of this patent is extended or adjusted under 35 U.S.C. 154(b) by 643 days.

(21) Appl. No.: 12/114,197

(22) Filed: May 2, 2008

(65) Prior Publication Data
US 2009/0276603 A1 Nov. 5, 2009

(51) Int. Cl.
*G06F 17/30* (2006.01)
(52) U.S. Cl. .................... 707/809; 707/812
(58) Field of Classification Search .................. 707/609, 707/809
See application file for complete search history.

(56) References Cited

U.S. PATENT DOCUMENTS

| | | | | |
|---|---|---|---|---|
| 6,223,182 | B1 * | 4/2001 | Agarwal et al. | 707/999.102 |
| 6,895,487 | B2 * | 5/2005 | Thusoo et al. | 711/173 |
| 7,103,590 | B1 * | 9/2006 | Murthy et al. | 707/999.003 |
| 7,124,141 | B2 * | 10/2006 | Norcott | 707/769 |
| 2005/0187897 | A1 * | 8/2005 | Pawar et al. | 707/1 |

OTHER PUBLICATIONS

Lutz Hartmann, "How to Adjust the High Watermark in Oracle 10g—Alter Table Shrink", Sysdba blog, posted Apr. 28, 2006, pp. 1-4.*
Scott Urman, Ron Hardman & Michael McLaughlin, Oracle Database 10g PL/SQL Programming, Sep. 16, 2004, Oracle Press, pp. 768-769.*
Oracle Database Administrator's Guide 10g Release 2, May 2006, Oracle, pp. 14-1 to 15-38.*
"Sarvesh's SQL Server Journey", posted Aug. 30, 2010, pp. 1-3.*
Sally Banyan, "Oracle Partitioning—Issues and Handy Tips and Tricks", Feb. 2002, pp. 1-6.*
Ask Tom, "Oracle Table—Partition", posted Sep. 9, 2000, pp. 1-3.*
Ask Tom, "High Water Mark", posted Oct. 15, 2007, pp. 1-10.*
"My Oracle: HWM—High Water Mark", posted Jul. 9, 2008, pp. 1-4.*
"My Oracle: Resetting High Water Mark in Oracle 10g", posted Sep. 29, 2009, pp. 1-3.*
Andrew Deighton, "How to Prevent Database Flooding", retrieved from the Internet Archive Wayback Machine, originally archived on Dec. 12, 2006, pp. 1-4.*
ITNirvanas: High Water Mark (Oracle), posted Jan. 7, 2009, pp. 1-2.*

* cited by examiner

*Primary Examiner* — Cheryl Lewis
*Assistant Examiner* — Scott A Waldron
(74) *Attorney, Agent, or Firm* — Kilpatrick Townsend & Stockton LLP

(57) ABSTRACT

Techniques for efficiently loading data into a partition of a partitioned table of a database are provided. Data is stored in a swap table and the high water mark of the swap table has been reset prior to storing the data. The swap table is swapped with the partition. After the swap, the swap table becomes the partition of the partitioned table and the partition of the partitioned table becomes the swap table, and the swap table is truncated to reset the high water mark of the swap table.

20 Claims, 3 Drawing Sheets

TECHNIQUES FOR EFFICIENT DATALOADS INTO PARTITIONED TABLES USING SWAP TABLES

BACKGROUND OF THE INVENTION

The present application relates to database systems and more particularly to techniques for efficiently loading data into partitioned database tables.

Many conventional database systems organize and store data in tables, with each table having a fixed number of columns and a variable number of rows. In many conventional database systems, database tables may be partitioned in order to increase manageability of the data, to increase performance of queries accessing and/or updating the table, and to increase the availability of the data to be stored in the table. Partitioning may be used to divide the table into a plurality of partitions, with each partition comprising a subset of the rows of data stored in the table. Various actions, such as data loads, creation and rebuilding of indices, and backup and recovery operations, may be performed on each individual partition rather than on the entire table.

Often data in a table may need to be reloaded by deleting existing data in a table and inserting new data. One benefit of partitioning a table is that data in one partition may be reloaded without affecting access to data stored in other partitions. However, data in the partition being reloaded will be inaccessible during the reloading process, and reloading a data partition may involve copying of large amounts of data and/or performing complex calculations on raw data to generate the data to be used to populate the partition, such as calculating rollup values across various dimensions. Thus, data in the partition may be inaccessible for a significant amount of time.

One approach taken in many conventional database systems to minimize the amount of time that a partition is unavailable during reloading is to create a temporary table and populate the temporary table with the data that is to be loaded into the partition. Once the data has been created in the temporary table, the data from the temporary table may be copied into the partition, and any data that was in the partition prior to copying the data from the temporary table may be deleted. Once the copy and delete steps have been completed, the temporary table is no longer needed and may be deleted. This process minimizes the amount of time that the partition is unavailable by generating the data and inserting the data into the temporary table before copying the data to the partition.

During the process of copying the data from the temporary table to the partition, a redo log may be created. The redo log tracks every change to the partition (such as data inserted, data modified, data deleted) that is made during the copying process. The redo log is created to enable the changes to the partition to be rolled back and the previous state of the partition to be restored if an error occurs during the copying process. Creating the redo log may be extremely resource intensive, because the number of records in the snapshot data may be very large. Furthermore, the data in the partition will be unavailable while the data is being copied from the temporary table to the partition, which may take a significant amount of time depending upon how much data is to be copied.

Another problem with the copy and delete process described above is that the high water mark for the partition may become artificially inflated as a result of copying the data from the temporary table into the partition before deleting data that already exists in the partition. The high water marks represents a maximum amount of data that has been stored in the partition. As data is added to the partition, additional storage space is formatted for storing data and is associated with the partition. The high water mark may not, however, represent the current amount of data stored in the partition. If data is deleted from the partition, the amount of storage space formatted for storing data does not decrease even though the amount of storage space actually being used may be less than the amount of storage space that has been formatted and allocated to the partition.

Storage space below the high water mark cannot be deallocated. As a result, due to a high water mark for a partition, the actual amount of data stored in the partition may be small compared to the amount of formatted but unused storage space allocated to the partition, thereby resulting in a substantial amount of unused but allocated storage space for the partition that cannot be deallocated. Due to the inflated high water mark, queries and other operations run against the partition will have to examine all of the allocated storage space including the unused portions. Therefore, execution of queries in such a partition may cause unnecessary processing resulting in inefficiencies and wasted use of resources significantly impact response times.

Accordingly, techniques that overcome the problems of conventional systems and methods described above and provide for efficient data loads into partitioned tables are desired.

BRIEF SUMMARY OF THE INVENTION

Techniques for efficiently loading data into a partition of a partitioned table of a database are provided. Data is stored in a swap table and the high water mark of the swap table has been reset prior to storing the data. The swap table is swapped with the partition. After the swap, the swap table becomes the partition of the partitioned table and the partition of the partitioned table becomes the swap table, and the swap table is truncated to reset the high water mark of the swap table.

According to an embodiment, a method for loading data in a computing system is provided. The method includes collecting data from one or more data sources. The data sources may comprise various types of sources of raw data, such as databases and/or Internet-based content such as blogs, newsfeeds, websites and/or other types of data. The method further comprises inserting the data from the first set of one or more data sources into a swap table, and swapping the swap table with a first partition of a report data table. Swapping the swap table with a first partition of a partitioned table, wherein swapping the swap table with the first partition results in data from the swap table becoming the contents of the first partition and data from the first partition prior to the swap becoming the contents of the swap table after the swap. The method also includes truncating the swap table to delete existing data in the swap table after the swap.

According to another embodiment, a database system is provided. The system includes a partitioned table, a first data collector, and a scheduler. The partitioned table comprises a first set of one or more data partitions and each data partition is used to store data from a set of one or more data sources. The first data collector is configured to collect information of a first data type from a first set of one or more data sources and to insert the data from the first set of one or more data sources in to a first swap table. The scheduler is configured to execute tasks at predetermined intervals, and the scheduler is configured to execute the first data collector, to swap the swap table with a first partition of the partitioned table, and to truncate the first partition to delete any existing data in the first partition. Swapping the swap table with the first partition results in data from the swap table becoming the contents of the first partition and data from the first partition prior to the swap becoming the contents of the swap table after the swap.

Other features and advantages of the invention will be apparent in view of the following detailed description and preferred embodiments.

BRIEF DESCRIPTION OF THE DRAWINGS

Embodiments of the invention are described here, with reference to the figures. Where elements of the figures are called out with reference numbers, it should be understood that like reference numbers refer to like elements and might or might not be the same instance of the element.

DETAILED DESCRIPTION OF THE INVENTION

In the following description, for the purposes of explanation, specific details are set forth in order to provide a thorough understanding of the invention. However, it will be apparent that the invention may be practiced without these specific details.

Techniques for efficiently loading data into a partition of a partitioned table of a database are provided. Data to be used to populate the partition is collected from one or more data sources and inserted into a swap table and the swap table is swapped with the partition. After the swap, the partition comprises the contents of the swap table prior to the swap and the swap table comprises the contents of the partition prior to the swap. Unlike conventional techniques for populating partitions of data tables, the high water mark of the partition reflects the actual amount of data in the partition after the swap. The swap table may be reused by truncating the swap table after the swap in order to delete any data in the swap table and reset the high water mark of the swap table to reflect that the data in the swap table has been deleted.

Figure 1:
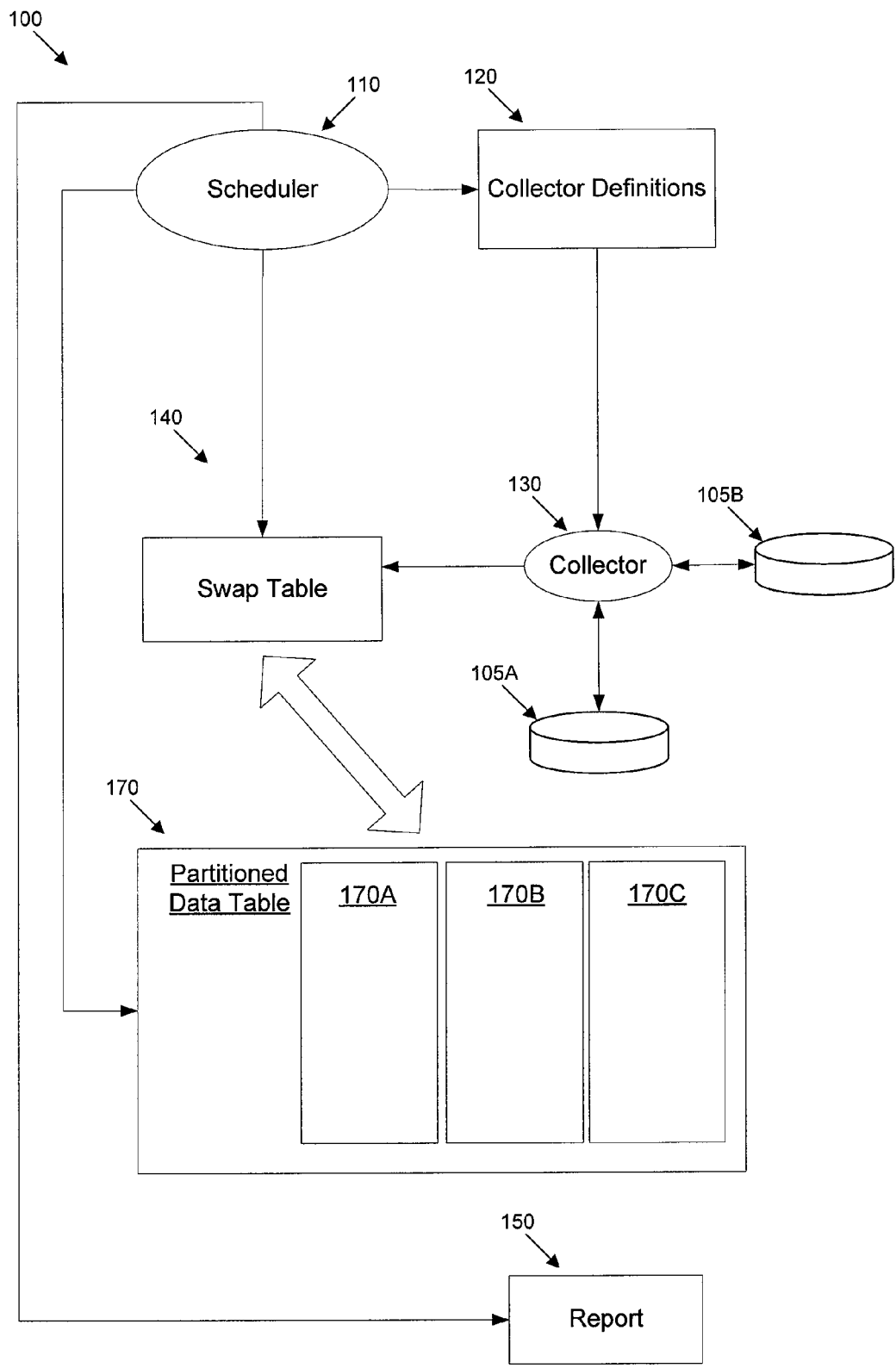
FIG. 1 is a simplified block diagram of a system for performing efficient data loads into a partitioned table according to an embodiment of the present invention.

FIG. 1 is a simplified block diagram of a system 100 for loading data into a partitioned database table 170 according to an embodiment of the present invention. System 100 comprises a scheduler 110, a swap table 140, collector definitions 120, data collector 130, data sources 105A and 105B, and partitioned data table 170 comprising partitions 170A, 170B and 170C, and report 150.

A data source, such as data sources 105A and 105B, provides raw data that will be used to populate a partition of partitioned database table 170. Data sources 105A and 105B may comprise various types of sources of raw data, such as databases and/or Internet-based content such as blogs, newsfeeds, websites and/or other sources of data. Data collector 130 is configured to gather data from data sources 105A and 105B. According to one embodiment of the present invention, data collector may collect data from one or more data sources. According to one embodiment of the present invention, data collector 130 may be implemented as executable processes or scripts that are periodically executed and programmed to collect data from data sources 105A and 105B according to a schedule. The data collectors may be scheduled to run on different dates and/or times.

Swap table 140 is a database table that receives and stores the data collected by data collector 130. According to an embodiment, system 100 may comprise multiple data collectors and a separate swap table may be associated with each collector. Data collector 130 writes data gathered from data sources 105A and 105B to swap data table 140. According to one embodiment of the present invention, data collector 130 may first process the raw data gathered from data sources 105A and 105B before writing the processed and/or data to swap table 140. For example, data collector 130 may convert the raw data from a source data format to a target data format and/or perform other processing on the raw data before writing the data to swap table 140. According to some embodiments, data collector 130 is configured to automatically run on a periodic basis under control of scheduler 110. In some other embodiments data collector 130 may also be run "on demand" upon receiving an instruction to collect data from data sources 105A and 105B.

Scheduler 110 may be configured to perform various tasks in system 100 at a specified time or according to a specified time interval. According to some embodiments, the scheduler might be implemented as process within a database management system or a data warehouse, or according to other embodiments scheduler 110 may be a standalone program or process.

In one embodiment, scheduler 110 reads collector definitions 120 to determine which data collectors need to be run and when the data collectors need to be run. In one embodiment, collector definitions 120 comprises a database table in a database or data warehouse. In alternative embodiments, collector definitions 120 might comprise configuration data stored in a system memory, comprise a set of registry entries, or might comprise a configuration file, and the like.

Collector definitions 120 includes information that the scheduler uses to initialize the execution of a data collector. For example, an entry in the collector definitions 120 may include a data type identifier associated with a collector that indicates a type of data that the collector will gather, an executable identifier that identifies a script or program for collecting data of the type of data specified in the collector definition, and a date-time and/or time interval indicating when the collector is to be executed by scheduler 110. In one embodiment, data collector 130 may be a PL/SQL script the execution of which is initialized by scheduler 110. If swap table 140 does not exist, data collector 130 or scheduler 140 may be configured to create a swap table 140.

Partitioned data table 170 is a data table that comprises one or more partitions. As depicted in FIG. 1, table 170 comprises partitions 170A, 170B and 170C. Partitioned data table 170 may be part of a data repository such as a data warehouse. Each partition stores data collected by a data collector, such as data collector 130.

A collector runs and populates a swap table associated with the collector. The swap table contains no data prior to the collector running and populating the table with data, and the high water mark of the table reflects that that no data is stored in the table. Thus, after the swap table is populated by the collector, the high water mark of the swap table reflects the actual amount of data stored in the swap table.

According to one embodiment, the swap table may be reused multiple times by the collector and/or by another collector. If the swap table already exists, the swap table will be truncated before the collector runs and populates the swap table with new data. Truncating the swap table deletes any data that is stored in the swap table and resets the high water mark of the table to reflect that no data is stored in the swap table.

When the collector has finished populating the swap table, the collector notifies scheduler 110 that the process is complete. Upon receiving notification from the collector that the collector has completed processing, scheduler 110 executes a swap operation that swaps the populated swap table 140 with a partition of partitioned data table 170 that stores data collected by data the collector 130. The swapping operation results in the contents of swap table 140 prior to the swap becoming the contents of the partition of partitioned table 170 and the contents of the partition prior to the swap becoming the contents of swap table 140. Thus, the data generated by the collector and stored in the swap table becomes part of the data stored in the table partition and any existing data that was in the partition prior to the swap is now stored in the swap table.

Accordingly, by performing a swap operation according to embodiments of the present invention, the high water marks of both the partition of the partitioned table 170 and swap table 140 will reflect the actual amounts of data stored therein. Due to the swap operation, contents of the swap table prior to the swap becomes the contents of the partition after the swap and the high water mark of the swap table prior to the swap becomes the high water mark of the partition, which reflects the actual amount of data stored in the partition after the swap operation. Also due to the swap operation. As a result, inflated water mark problem associated with conventional copy and delete techniques is eliminated. This enables faster and more efficient processing of data in the partition including faster access to the data stored in the partition, efficient execution of queries accessing data stored in the partition, and the like.

After the swap is completed, swap table 140 is then truncated to delete all data in the swap table. The swap table is then ready to be reused for another swap. Truncating a swap table 140 resets the high water mark of swap table 140, thus the high water mark will represent the actual amount of data stored in swap table 140. According to an embodiment, truncating swap table 140 sets the high water mark to zero. When swap table 140 is then populated with data from a collector, the high water mark of the swap table reflects the actual amount of data stored in the swap table and not an inflated value. This in turn causes the partition to have a non-inflated high water mark after a swap operation with the swap table as previously described. Thus, unlike the conventional copy and delete technique described above, the high water mark of the partition will reflect the actual amount of data in the partition rather than the inflated high water mark that results from the conventional copy and delete methods described above.

According to some embodiments, the scheduler automatically determines the name of the swap table associated with each data collector using a naming convention. The naming convention facilitates identification of the swap table associated with a collector. For example, according to an embodiment, the scheduler may determine the name of the swap table associated with a particular collector by appending a table name prefix to an identifier associated with the collector. For instance, if the table name prefix is "swap_table_" and data collector 130 is associated with an identifier "100," "swap_table_100" is the name that will be with data collector 130. According to other embodiments, the collector may provide the name of the swap table that the collector has populated to the scheduler when the collector notifies the scheduler that the collector has completed processing.

The data stored in partitioned data table 170 may be used for several different purposes. For example, one or more reports may be generated based upon the data in partitioned data table 170. For example, in FIG. 1, report 150 is a report generated from data stored in partitioned data table 170. Report 150 may be based on data from one or more of the partitions in partitioned data table 170. In one embodiment of the present invention, the scheduler 110 may be configured to execute scripts to generate the report.

Figure 2:
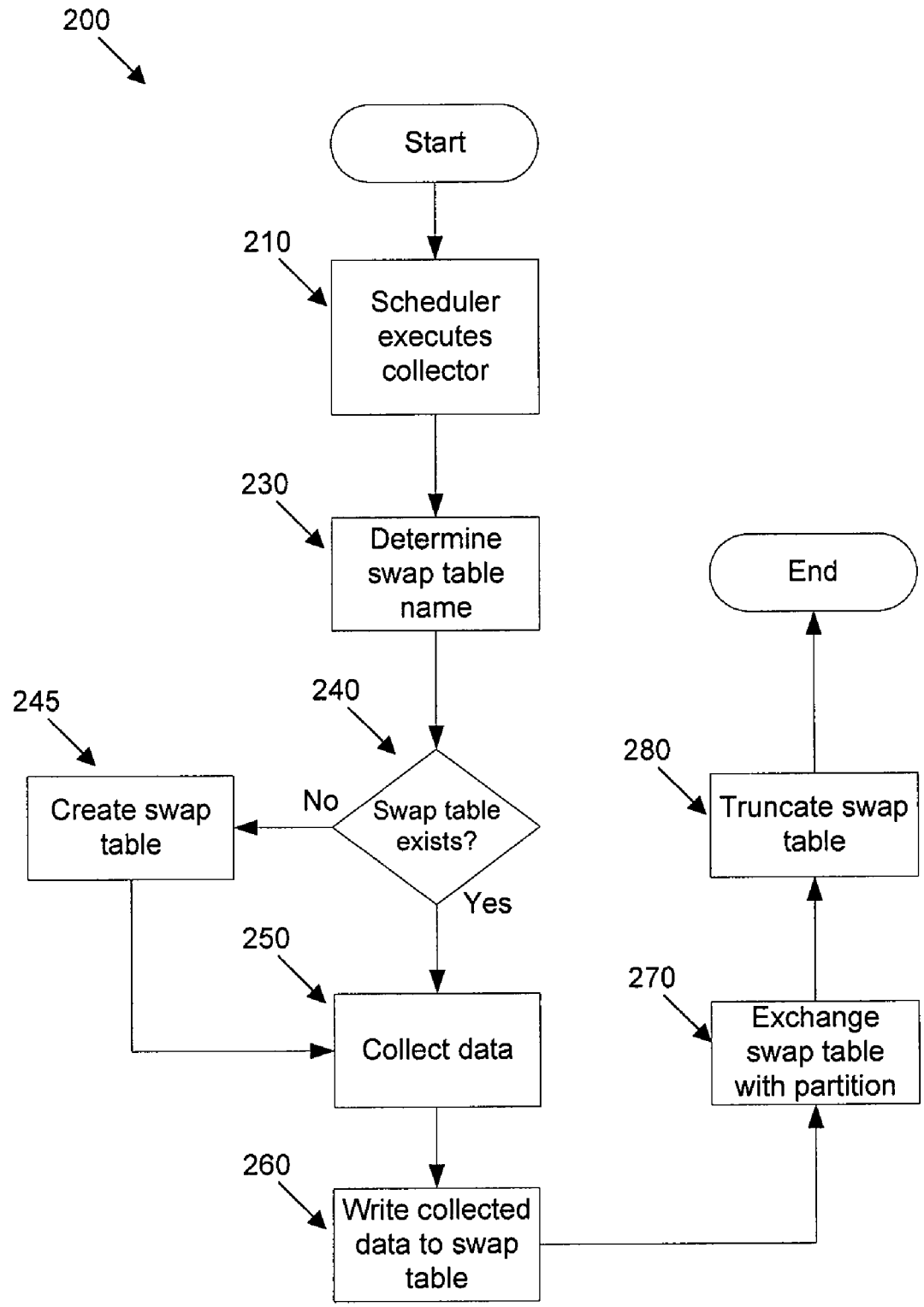
FIG. 2 is a flowchart illustrating a method for loading data into a partitioned table according to an embodiment of the present invention.

FIG. 2 is a simplified flowchart illustrating a method 200 for efficiently loading data into a partitioned table according to an embodiment of the present invention. Method 200 may be performed by software (e.g. computer program code) executed by a processor, by hardware, or a combination thereof. In step 210, the scheduler initializes and executes a collector process. As described above, according to some embodiments, the scheduler may look up collector definitions in a table, such as collector definitions table 120, to determine which collector to invoke and also the time when the collector is to be invoked.

At step 230, the name of the swap table associated with the collector is determined. As described above, in one embodiment, the swap tables are assigned names according to a specific naming convention. For example, the swap tables may be named according to the an identifier associated with the collector. Processing continues with step 240.

At step 240, a determination is made whether swap table 140 exists. If the swap table 140 does not exist, then processing continues with step 245 where swap table 140 is created. According to one embodiment, scheduler 110 is configured to determine whether swap table 140 exists and to create swap table 140 if swap table 140 does not exist. In other embodiments, collector 130 is configured to determine whether swap table 140 exists and to create swap table 140 if swap table 140 does not exist. Method 200 then continues with step 250.

At step 250, data is collected from data sources 105A and 105B by data collector 130. Data collector 130 may obtain data from one or more data sources. Data collector 130 may execute one or more executable scripts, such as a PL/SQL scripts that facilitate collection of the data. The collector may also be an executable process or program code configured to collect data from one or more data sources. Method 200 then continues with step 260.

At step 260, the data collected by the collector is written to a swap table. According to some embodiments, the steps 250 and 260 may be performed iteratively with data being collected and written to the swap table in multiple steps. In some embodiments, steps 250 and 260 may also be performed in parallel. Method 200 then continues with step 270.

After the steps of data collection 250 and writing the collected data to a swap table 260 have been completed, at step 270, swap table 140 is swapped with a partition of partitioned data table 170. After the swap in step 270, the swap table will now comprise data that was formerly stored in the partition, and the partition will comprise the newly collected data that was formerly in the swap table. Swapping the swap table with the corresponding partition in the partitioned data table enables the partition to be updated in one operation without having to perform the conventional method of deleting the existing data in the partition and copying the new data into the partition. Furthermore, swapping the swap table with the first partition also results in the high water mark of the partition being set to the high water mark of the swap table prior to the swapping. Thus, unlike the conventional copy and delete method, the high water mark of the partition actually corresponds to the actual amount of data stored in the partition. Method 200 then continues with step 280.

At step 280, the swap table 140 is truncated to delete the data in swap table 140. After step 270, swap table 140 stored the data that was formerly stored in the partition of partitioned data table 170. Truncating swap table 140 also resets the high water mark of the swap table 140. The high water mark of swap table 140 is reset so that the next time that swap table 140 is used the high water mark will reflect the actual amount of data stored in swap table 140. According to one embodiment, the high water mark of swap table is reset to zero. The process then terminates at step 299.

Figure 3:
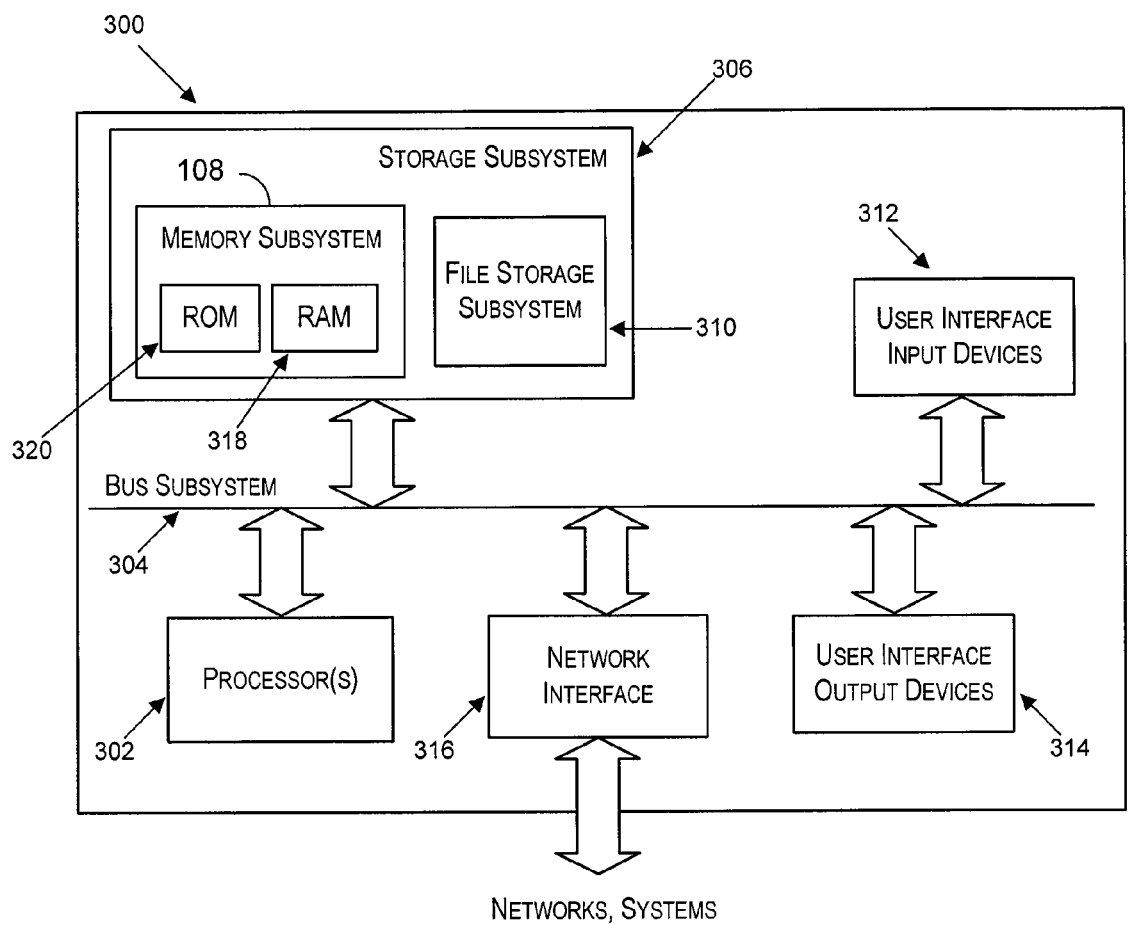
FIG. 3 is a block diagram of a computer system in which the report generation system of FIG. 1 may be implemented according to an embodiment of present invention.

FIG. 3 is a simplified block diagram of a computer system 300 upon which a system for loading data into a partitioned database table, such as system 100 of FIG. 1, may be implemented according to an embodiment of present invention. As shown in FIG. 3, computer system 300 includes a processor 302 that communicates with a number of peripheral subsystems via a bus subsystem 304. These peripheral subsystems may include a storage subsystem 306, comprising a memory subsystem 308 and a file storage subsystem 310, user interface input devices 312, user interface output devices 314, and a network interface subsystem 316.

Bus subsystem 304 provides a mechanism for letting the various components and subsystems of computer system 300 communicate with each other as intended. Although bus subsystem 304 is shown schematically as a single bus, alternative embodiments of the bus subsystem may utilize multiple busses.

Network interface subsystem 316 provides an interface to other computer systems, networks, and portals. Network interface subsystem 316 serves as an interface for receiving data from and transmitting data to other systems from computer system 300.

User interface input devices 312 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 300.

User interface output devices 314 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 300.

Storage subsystem 306 may be configured to store the basic programming and data constructs that provide the functionality of the present invention. Software (code modules or instructions) that provides the functionality of the present invention may be stored in storage subsystem 306. These software modules or instructions may be executed by processor(s) 302. Storage subsystem 306 may also provide a repository for storing data used in accordance with the present invention. Storage subsystem 306 may comprise memory subsystem 308 and file/disk storage subsystem 310.

Memory subsystem 308 may include a number of memories including a main random access memory (RAM) 318 for storage of instructions and data during program execution and a read only memory (ROM) 320 in which fixed instructions are stored. File storage subsystem 310 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 300 can be of various types including a personal computer, a portable computer, a workstation, a network computer, a mainframe, a kiosk, a server or any other data processing system. Due to the ever-changing nature of computers and networks, the description of computer system 300 depicted in FIG. 3 is intended only as a specific example for purposes of illustrating the an embodiment of a computer system that may be used to implement the present invention. Many other configurations having more or fewer components than the system depicted in FIG. 3 are possible.

While the embodiments described above may make reference to specific hardware and software components, those skilled in the art will appreciate that different combinations of hardware and/or software components may also be used and that particular operations described as being implemented in hardware might also be implemented in software or vice versa.

Computer programs comprising a plurality of instructions for controlling a data processor to perform various tasks incorporating various features of the present invention may be encoded on various computer readable media for storage and/or transmission; suitable media include magnetic disk or tape, optical storage media such as compact disk (CD) or DVD (digital versatile disk), flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A method for loading data into a partitioned table, the method comprising:

executing by a scheduler executed by the computer system one or more tasks at predetermined intervals;

collecting by a first data collector executed by a computer system and based on the tasks executed by the scheduler data from a first set of one or more data sources, the first data collector associated with the first set of one or more data sources;

storing by the computer system the data from the first set of one or more data sources in a first swap table, the first swap table associated with the first data collector, wherein prior to storing the data from the first set of one or more data sources the first swap table contains no data and a high water mark of the first swap table has been reset to reflect that the first swap table contains no data and after storing the data from the first set of one or more data sources the high water mark of the first swap table indicates an actual amount of data in the first swap table;

swapping by the computer system and based on the tasks executed by the scheduler the first swap table with a first partition of the partitioned table;

truncating by the computer system and based on the tasks executed by the scheduler the first swap table to reset the high water mark for the first swap table after swapping the first swap table with the first partition of the partitioned table;

collecting by a second data collector executed by the computer system and based on the tasks executed by the scheduler data from a second set of one or more data sources, the second data collector associated with the second set of one or more data sources and separate from the first data collector;

storing by the computer system the data from the second set of one or more data sources in a second swap table, the second swap table associated with the second data collector and separate from the first swap table, wherein prior to storing the data from the second set of one or more data sources the second swap table contains no data and a high water mark of the second swap table has been reset to reflect that the second swap table contains no data and after storing the data from the second set of one or more data sources the high water mark of the second swap table indicates an actual amount of data in the second swap table;

swapping by the computer system and based on the tasks executed by the scheduler the second swap table with a second partition of the partitioned table; and truncating by the computer system and based on the tasks executed by the scheduler the second swap table to reset the high water mark for the second swap table after swapping the second swap table with the second partition of the partitioned table.

2. The method of claim 1, wherein swapping the first swap table with the first partition comprises setting a high water mark of the first swap table to a high water mark of the first partition prior to swapping and setting the high water mark of the first partition to the high water mark of the first swap table prior to the swapping.

3. The method of claim 2, wherein truncating the first swap table after the swapping further comprises setting the high water mark of the first swap table to zero.

4. The method of claim 1, further comprising:
determining by the computer system whether the first swap table exists; and
creating by the computer system the first swap table if the first swap table does not already exist.

5. The method of claim 1, wherein the first set of one or more data sources and the second set of one or more data sources each comprise one or more of a database, a blog, a newsfeed, or a website.

6. A system comprising:
a processor; and
a memory communicatively coupled with and readable by the processor and having stored therein a sequence of instructions which, when executed by the processor, cause the processor to execute:
a first data collector associated with a first set of one or more data sources wherein the first data collector:
collects data from the first set of one or more data sources; and
stores the data from the first set of one or more data sources to a first swap table, the first swap table associated with the first data collector, wherein prior to storing the data from the first set of one or more data sources the first swap table contains no data and a high water mark of the first swap table has been reset to reflect that the first swap table contains no data and after storing the data from the first set of one or more data sources the high water mark of the first swap table indicates an actual amount of data in the first swap table;
a second data collector associated with a second set of one or more data sources and separate from the first data collector wherein the second data collector:
collects data from the second set of one or more data sources; and
stores the data from the second set of one or more data sources to a second swap table, the second swap table associated with the second data collector and separate from the first swap table, wherein prior to storing the data from the second set of one or more data sources the second swap table contains no data and a high water mark of the second swap table has been reset to reflect that the second swap table contains no data and after storing the data from the second set of one or more data sources the high water mark of the second swap table indicates an actual amount of data in the second swap table; and
a scheduler wherein the scheduler executes tasks at predetermined intervals to:
cause the first data collector to periodically collect data from the first set of one or more data sources;
cause the second data collector to periodically collect data from the second set of one or more data sources;
swap the first swap table with a first partition of a partitioned table;
truncate the first swap table to reset the high water mark for the first swap table after swapping the first swap table with the first partition of the partitioned table;
swap the second swap table with a second partition of the partitioned table; and
truncate the second swap table to reset the high water mark for the second swap table after swapping the second swap table with the second partition of the partitioned table.

7. The system of claim 6, wherein swapping the first swap table with the first partition comprises setting a high water mark of the first swap table to a high water mark of the first partition prior to swapping and setting the high water mark of the first partition to the high water mark of the first swap table prior to the swapping.

8. The system of claim 7, wherein truncating the first swap table after the swapping further comprises setting the high water mark of the first swap table to zero.

9. The system of claim 6, wherein the scheduler is further configured to determine whether the first swap table exists and to create the first swap table if the first swap table does not exist.

10. The system of claim 9, wherein determining whether the first swap table exists includes identifying the first swap table using an identifier associated with the first data collector.

11. The system of claim 6, further comprising:
a data collector definitions table, the data collector definitions table providing definitions of data collectors to be executed by the scheduler.

12. The system of claim 11, wherein the data collector definitions table includes an entry for the first data collector and wherein the scheduler causes the first data collector to collect the data from the one or more data sources based on the entry for the first data collector.

13. The system of claim 12, wherein the data collector definitions table includes an entry for a second data collector and wherein the scheduler causes the second data collector to collect the data from the one or more data sources based on the entry for the second data collector.

14. The system of claim 12, wherein the first data collector notifies the scheduler upon completion of collecting the data of the first set of one or more data sources and wherein the scheduler swaps the first swap table with the first partition of the partitioned table and truncates the first swap table in response to the notification from the first data collector.

15. The system of claim 6, wherein swapping the second swap table with the second partition comprises setting a high water mark of the second swap table to a high water mark of the second partition prior to swapping and setting the high water mark of the second partition to the high water mark of the second swap table prior to the swapping.

16. The system of claim 15, wherein truncating the second swap table further comprises setting the high water mark of the second swap table to zero.

17. A computer readable memory device storing a plurality of instructions which, when executed by a processor, cause the processor to load data into a partitioned table by:
- executing by a scheduler one or more tasks at predetermined intervals;
- collecting by a first data collector based on the tasks executed by the scheduler data from a first set of one or more data sources, the first data collector associated with the first set of one or more data sources;
- storing the data from the first set of one or more data sources in a first swap table, the first swap table associated with the first data collector, wherein prior to storing the data from the first set of one or more data sources the first swap table contains no data and a high water mark of the first swap table has been reset to reflect that the first swap table contains no data and after storing the data from the first set of one or more data sources the high water mark of the first swap table indicates an actual amount of data in the first swap table;
- swapping based on the tasks executed by the scheduler the first swap table with a first partition of the partitioned table;
- truncating based on the tasks executed by the scheduler the first swap table to reset the high water mark for the first swap table after swapping the first swap table with the first partition of the partitioned table;
- collecting by a second data collector based on the tasks executed by the scheduler data from a second set of one or more data sources, the second data collector associated with the second set of one or more data sources and separate from the first data collector;
- storing the data from the second set of one or more data sources in a second swap table, the second swap table associated with the second data collector and separate from the first swap table, wherein prior to storing the data from the first set of one or more data sources the first swap table contains no data and a high water mark of the first swap table has been reset to reflect that the first swap table contains no data and after storing the data from the second set of one or more data sources the high water mark of the second swap table indicates an actual amount of data in the second swap table;
- swapping based on the tasks executed by the scheduler the second swap table with a second partition of the partitioned table; and
- truncating based on the tasks executed by the scheduler the second swap table to reset the high water mark for the second swap table after swapping the second swap table with the second partition of the partitioned table.

18. The computer readable memory device of claim 17, wherein swapping the first swap table with the first partition comprises setting a high water mark of the first swap table to a high water mark of the first partition prior to swapping and setting the high water mark of the partition to the high water mark of the first swap table prior to the swapping.

19. The computer readable memory device of claim 18, wherein truncating the first swap table comprises setting the high water mark of the first swap table to zero.

20. The computer readable memory device of claim 17, further comprising:
- determining whether the first swap table exists; and
- creating the first swap table if the first swap table does not already exist.

* * * * *

UNITED STATES PATENT AND TRADEMARK OFFICE
CERTIFICATE OF CORRECTION

| | |
|---|---|
| PATENT NO. | : 8,296,336 B2 |
| APPLICATION NO. | : 12/114197 |
| DATED | : October 23, 2012 |
| INVENTOR(S) | : Menon et al. |

It is certified that error appears in the above-identified patent and that said Letters Patent is hereby corrected as shown below:

In column 6, line 20, delete "the an" and insert -- an --, therefor.

In column 8, line 3, delete "the an" and insert -- an --, therefor.

Signed and Sealed this
Twenty-second Day of January, 2013

David J. Kappos
*Director of the United States Patent and Trademark Office*